United States Patent [19]

Vanderwoude

[11] Patent Number: 5,028,376
[45] Date of Patent: Jul. 2, 1991

[54] PLASTIC PIPE EXTRUSION

[75] Inventor: Mark D. Vanderwoude, Brownwood, Tex.

[73] Assignee: Phillips Petroleum Company, Bartlesville, Okla.

[21] Appl. No.: 384,581

[22] Filed: Jul. 24, 1989

[51] Int. Cl.$^5$ .............................. B29C 47/88
[52] U.S. Cl. .................... 264/566; 264/568; 264/209.4; 425/71; 425/72.1; 425/326.1; 425/379.1
[58] Field of Search ............ 264/568, 566, 209.4, 264/209.7; 425/72.1, 71, 326.1, 378.1, 379.1

[56] References Cited

U.S. PATENT DOCUMENTS

| | | | |
|---|---|---|---|
| 2,641,022 | 6/1953 | Kress | 264/560 |
| 3,212,135 | 10/1965 | Branscum | 264/209.4 |
| 3,393,427 | 7/1968 | Larsen | 18/14 |
| 3,471,899 | 10/1969 | Ronden | 18/14 |
| 3,522,337 | 7/1970 | Ball | 425/72.1 |
| 3,538,210 | 11/1970 | Gatto | 264/237 |
| 3,954,361 | 5/1976 | Page | 425/72 S |
| 3,990,828 | 11/1976 | Reifenhäuser | 425/72.1 |
| 4,088,724 | 5/1978 | Kuhnert | 264/85 |
| 4,113,814 | 9/1978 | Kojimoto et al. | 264/167 |
| 4,164,388 | 8/1979 | Inman et al. | 425/378 R |
| 4,314,958 | 2/1982 | Macleod et al. | 264/167 |
| 4,340,340 | 7/1982 | Brown et al. | 264/568 |
| 4,663,107 | 5/1987 | Takada et al. | 264/519 |
| 4,750,873 | 6/1988 | Loe et al. | 425/71 |
| 4,808,098 | 2/1989 | Chan et al. | 425/72.1 |
| 4,818,467 | 4/1989 | Audureau | 264/564 |

FOREIGN PATENT DOCUMENTS 2442714 8/1980 France .................. 425/380

*Primary Examiner*—Jeffery Thurlow
*Attorney, Agent, or Firm*—George E. Bogatie

[57] ABSTRACT

In the extrusion of plastic pipe wherein the pipe is in a self supporting but semi-molten state on exiting a die orifice, the inner surface of the extrudate is cooled by a device which applies a suction for establishing flow of a cooling fluid which contacts the inner surface of the extrudate. In a further embodiment the flow of cooling fluid established for cooling the extrudate additionally cools a cavity within a mandrel of the die orifice.

16 Claims, 3 Drawing Sheets

PLASTIC PIPE EXTRUSION

This invention relates to the extrusion of plastic pipe. In one aspect this invention relates to a method of and an apparatus for extruding thermoplastic materials to form pipes or other hollow elongated articles having preselected cross sectional dimensions. In another aspect the present invention relates to improved apparatus and method for cooling the plastic material as it moves through and out of the die.

BACKGROUND OF THE INVENTION

Extruders commonly convert granular resin feeds into sheets, films and shapes such as pipes. Normally plastic pipe is produced by extruding molten plastic through a pipe shaping die orifice of an extruder. As used herein a pipe shaping die orifice is an elongated annular opening formed between an internal mandrel and a surrounding bushing which is spaced apart from the internal mandrel.

Since the viscosity of the molten plastic is temperature dependent, temperature measurement is an important operational guide to extruder operation. Temperature control schemes generally divide the extruder barrel into temperature control zones, with a temperature control loop including a controller, temperature sensor, heater and an over temperature alarm for each zone. Band-type electrical resistance heaters of two piece construction to facilitate removal are generally employed for directly heating the barrel.

Extruders require large heater ratings to decrease heating time. After extrusion has begun, however, heat is internally generated from friction, and at high production speeds the internal temperature, if uncontrolled, rises above the accepted maximum.

One of the factors which limits the production rate of an article formed by extruding a plastic material through an elongated die orifice is the rate at which heat can be removed from the article as it moves through the die. For an extrudate to be formed so that it is self-supporting when it emerges from the die, the plastic must be cooled below its solidification temperature before exiting the die. In the past this cooling has been accomplished by a variety of ways including, for example, circulating a cooling fluid through the outer portion or bushing of the die as well as through the mandrel. While cooling fluid circulation through the die, and other prior methods have proved effective for extruding relatively small diameter thin wall pipes, the prior art systems lack effectiveness in cooling larger diameter thicker wall pipes. This ineffectiveness in heat transfer from the plastic is due to the increased wall thickness of the large diameter pipe and thus lengthened heat conduction path for heat to escape from the extrudate so that heat is trapped around the mandrel of the die. The excessive temperature results in a condition known as control system temperature override which at least requires a reduction in extrusion speed and hence production rate to satisfy the temperature requirements.

Accordingly, it is an object of this invention to provide an improved method and apparatus for extruding plastic material.

Another object of this invention is to improve the rate of cooling the extrudate as it passes through the die of an extruder.

Still another object of this invention is to improve the production rate for extruding relatively large diameter pipes.

A yet more specific object of this invention is to provide a device for removing heat from the mandrel and from the inner surface of the extrudate passing from the die of an extruder.

BRIEF SUMMARY OF THE INVENTION

In accordance with this invention, it has been found that it is possible to cool the extrudate advancing through the die of an extruder by applying a suction for establishing flow of cooling fluid which contacts the inner surface of the plastic pipe.

In a preferred embodiment of this invention a semi-molten but self-supporting plastic pipe emerging from the pipe shaping orifice of an extruder is guided, while it is still hot and in a pliable state, to a sizing sleeve which can have a range of diameters which can be a smaller diameter or a larger diameter than the die orifice of the extruder. After being sized the extruded pipe is cooled by spraying a cooling fluid on the outer surface of a section of the pipe and further cooled along the inner surface of the entire length of the pipe by cool ambient air induced to flow toward the mandrel along the inner surface of the plastic pipe by the suction action of a venturi blower/exhauster. The venturi blower/exhauster is positioned along the longitudinal axis of the mandrel with the venturi blower outlet aligned so as to discharge in the axial direction with advancement of the plastic pipe. As used herein a venturi blower/exhauster is a venturi device in which a motive gas, such as compressed air, entering a motive gas inlet creates a vacuum at the suction inlet of the blower/exhauster which induces large volumes of surrounding air to enter the venturi blower/exhauster through the suction inlet and discharge rapidly through the venturi discharge outlet.

Additional objects, and advantages of the invention will be apparent from the following detailed description of the preferred embodiment of the invention as illustrated by the drawings in which.

DETAILED DESCRIPTION OF THE PREFERRED EMBODIMENT

Figure 1:
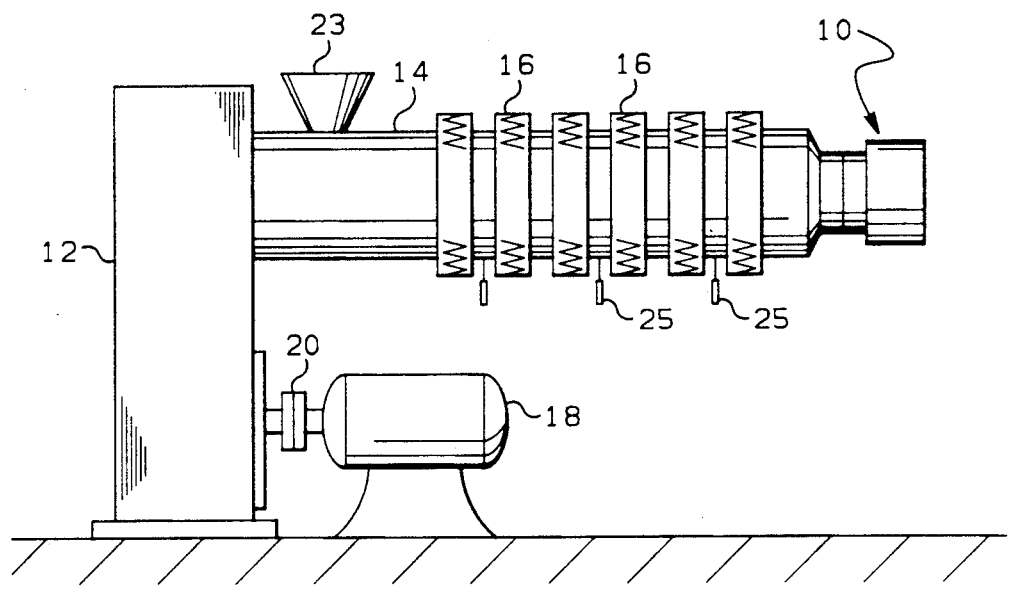
FIG. 1 is a schematic illustration of an extruder apparatus which can be used with the improved die of the present invention.

It will be appreciated by those skilled in the art that, since FIG. 1 is schematic only, many items of equipment which would be needed in a commercial plant for successful operation have been omitted for the sake of clarity. Such items of equipment would include, for example, pressure measurement instruments and corresponding controllers, additional temperature measurement instruments and temperature controllers, additional heat exchangers and valves, switches, etc., all these items would be provided in accordance with standard engineering practice and form no part in the explanation of the present invention.

Although the present invention is illustrated and described in terms of plastic pipe extrusion the present invention is applicable to the extrusion of any hollow elongated article of preselected cross sectional configuration which can be produced from a thermoplastic material. The preferred thermoplastic materials include but are not limited to polyethylene, polypropylene, polymethylpentene, polyhexene, and mixture of any two or more thereof.

Referring now to the drawings, and particularly to FIG. 1, the extrusion die of this invention, shown generally by reference numeral 10, is illustrated in conjunction with a single screw type extrusion apparatus, including gear box 12, which supports an extrusion barrel 14. A motor 18 and a coupler 20 which would drive the gear box 12 are also illustrated in FIG. 1.

Band type electrical resistance heaters 16, which are spaced along the length of the barrel 14 to insure that the plastic material is molten as it enters the extrusion die 10, are illustrated. Other types of heating can also be employed, for example, induction heating wherein the extruder barrel steel is heated by internal circulating electric currents may be employed, if desired. Temperature sensors 25 which are spaced apart along the length of the barrel are illustrated in FIG. 1. These temperature sensors 25 would be utilized in conjunction with temperature controllers, not illustrated in FIG. 1.

A thermoplastic material in particle form can be charged to a feed hopper 23 by any suitable means. It should be evident that the extrusion apparatus illustrated in FIG. 1 is for illustration only and that the extrusion die of the present invention can be used with any extruder including dynamic extruders, single or multiple screw extruders having multiple dies, and the like, provided they have the pumping capacity necessary.

Figure 2:
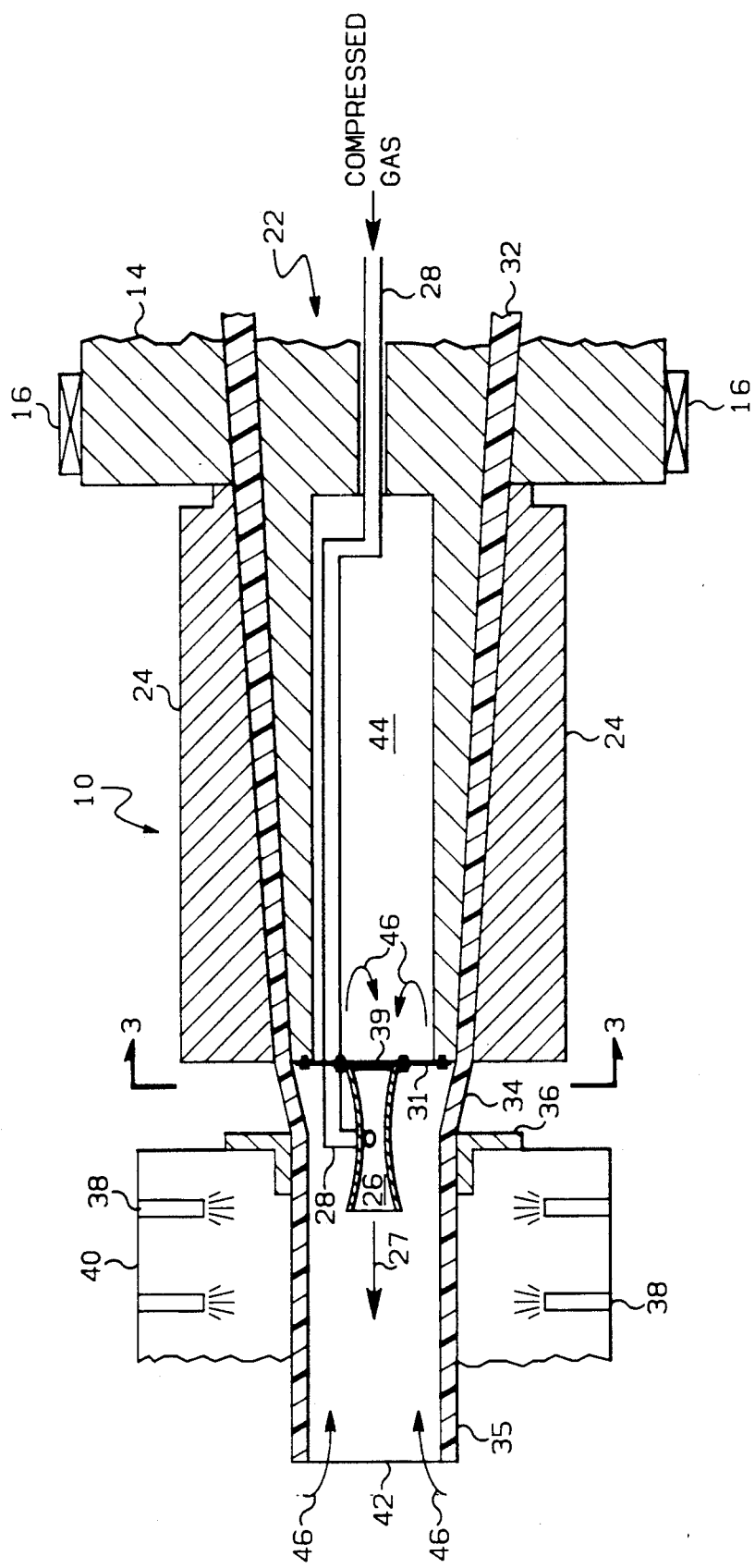
FIG. 2 is a cross sectional elevation view of an extrusion die according to the present invention.

Referring now to FIG. 2 of the drawings, the novel extrusion die of the present invention will be described in more detail. It should be obvious that the invention is not bound by the exact configuration illustrated in FIG. 2 since the novel concept of providing a venturi blower/exhauster for cooling the inner surface of the extrudate can be applied to various extrusion dies having various modifications.

The die 10 includes a mandrel 22 and a bushing 24 positioned around the mandrel and spaced apart therefrom. The annular opening between the bushing 24 and the mandrel 22 defines the pipe shaping orifice of the die 10. The relative size of the mandrel 22 and the bushing 24 which define the pipe shaping orifice of the die 10 may vary over wide limits.

In operation essentially liquid plastic material such as high density polyethylene 32, enters the die 10. Plastic pipe 34 which is in a semi-molten or expandable state with a plastic memory exits the end of the orifice in the die 10. This state of the plastic pipe is characterized by a temperature below the melting point in the case of crystalline plastic materials but not so far below the melting point that the material cannot be expanded and shrunk. The pipe when expanded and allowed to shrink returns to its original diameter.

On exiting the end of the orifice in the die 10 the semi-molten pipe 34 is guided through a sizing sleeve 36 which as previously stated may be a larger diameter or a smaller diameter than the pipe shaping orifice. The sleeve 36 illustrated in FIG. 2 is a smaller diameter than the pipe shaping orifice of die 10. U.S. Pat. No. 4,314,958, the disclosure of which is incorporated herein by reference, discloses an external expanding mandrel for increasing the diameter of the pipe to a maximum value significantly above the inner diameter of the die bushing, so that a preselected pipe diameter which is greater than the diameter of the bushing can be produced without changing the size of the pipe shaping orifice.

After passing through the sizing sleeve 36 the pipe 34 is rapidly cooled by means of a quench fluid sprayed onto the outer surface of the hot pipe 34 from quench nozzles 38. Preferably the quench fluid is sprayed onto the pipe within a vacuum tank 40. The cooled pipe 35 exiting the vacuum tank 40 is in a rigid state.

Figure 3:
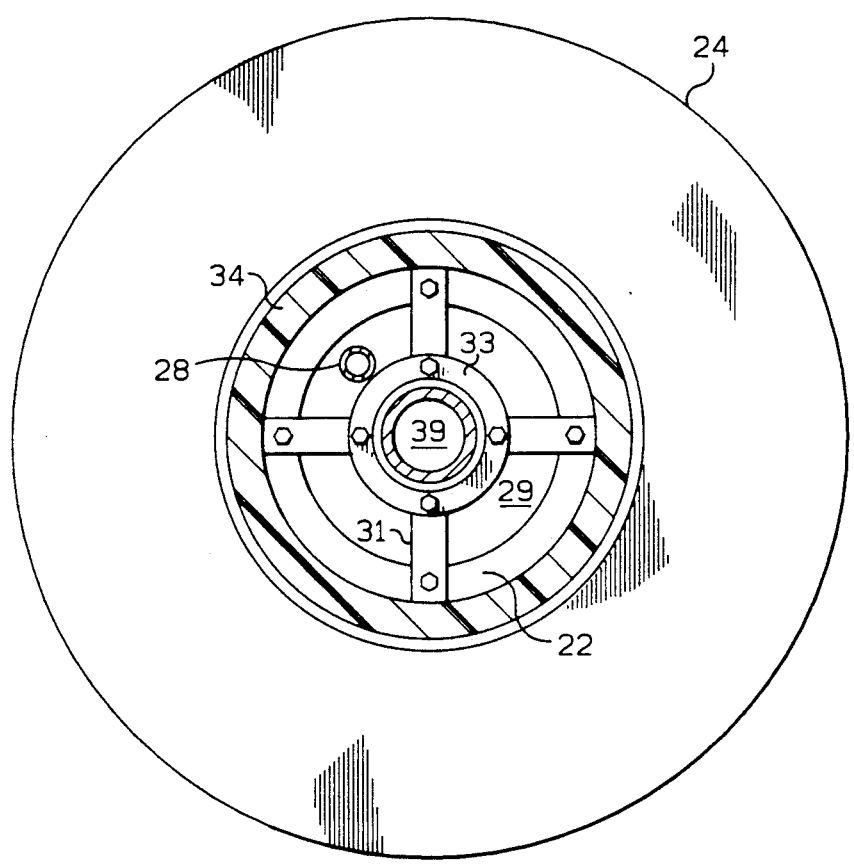
FIG. 3 is a cross sectional view taken along line 3—3 of FIG. 2.

As illustrated in FIG. 2 and FIG. 3, a venturi blower/exhauster 26, generally aligned with the longitudinal axis of the mandrel 22, is attached to the exit end 39 of the mandrel 22 by any suitable means. In a preferred embodiment an annular mounting flange 33 of the blower/exhauster 26 is supported by thin rigid members 31 bolted to the exit end of the mandrel 22 thus providing an opening 29 between the venturi blower/exhauster 26 and the cavity 44 of the mandrel 22. The size of the opening 29 may vary over wide limits.

The venturi blower/exhauster 26 is a well known component such as is described in Perry's Chemical Engineering Handbook, 5th Edition, Chapter 6, and is commercially available, for example, under the name Jet-air Venturi Blower/Exhauster from McMaster-Carr, Chicago, Ill.

The following specific example is intended to further illustrate this invention but not to limit the scope thereof unduly.

EXAMPLE

In an apparatus as shown in the drawings, plastic pipe was produced from a high density ethylene-hexene-copolymer known as Marlex ® TR480-01 manufactured by Phillips Petroleum Company, Bartlesville, Okla., which is a high density polyethylene having a density in the range of 0.945–0.952 g/cc determined in accordance with ASTM D-1505 and having a melt index of 13 g/min. The outer diameter of the pipe shaping orifice was 42 inches. The semi-molten pipe with a wall thickness of 3.5 inches was reduced in size and cooled according to this invention. The outer diameter of the resulting pipe was 32 inches with a nominal wall thickness of 2.91 inches.

For operation of the blower/exhauster 26, compressed air in a range from about 46 SCFM to about 315 SCFM and at a pressure in a range from about 20 psi to about 150 psi can be supplied to the motive gas inlet of blower/exhauster 26 with a resulting discharge flow in a range from about 1300 SCFM to about 8000 SCFM. In a presently preferred embodiment about 63 SCFM of compressed air at a pressure of about 80 psi was provided via conduit 28, and an exit volume of about 1400 cfm was directed along the center of the extruded pipe. Further in operation of the blower/exhauster 26 the volume of air entering the inlet 39 of blower/exhauster 26 was drawn from relatively cool ambient air surrounding the pipe 35 and drawn into the end of the pipe 42. The cooling fluid thus flowing along the inner surface of the pipe 34 countercurrent to the air flow indicated by the arrow 27 which is discharged from blower/exhauster 26. As illustrated in FIG. 2 the cooling air flows into the mandrel cavity 44. This cooling air flow is illustrated by the arrows 46 in FIG. 2.

Reasonable variations and modifications such as repositioning the blower/exhauster 26 within the cavity 44 of the mandrel 22 or within the pipe 34, which will become apparent to those skilled in the art, can be made That which is claimed is:

1. Apparatus comprising:
   an extruder having a pipe shaping die for extruding large diameter plastic pipe;
   a venturi blower/exhauster attachable to said pipe shaping die, said blower/exhauster having a motive gas inlet, a suction inlet and a discharge outlet;
   means for providing a relatively small volume of motive gas to said motive gas inlet; and
   wherein said relatively small volume of motive gas provided to said motive gas inlet induces a relatively large volume of cool ambient air to enter said suction inlet and exit said discharge outlet of said blower/exhauster so that said relatively large volume of cool ambient air cools the inner surface of said large diameter plastic pipe.

2. Apparatus in accordance with claim 1 wherein said pipe shaping die comprises a hollow mandrel having an inner surface and an outer surface and a bushing having an inner surface disposed about and spaced apart from said mandrel, the inner surface of said bushing and the outer surface of said mandrel defining a pipe shaping die orifice, and wherein said blower/exhauster further establishes flow of cool air which contacts said inner surface of said mandrel so as to cool the inner surface of said mandrel as well as the inner surface of said plastic pipe.

3. Apparatus in accordance with claim 1 wherein said pipe shaping die comprises an axial pipe shaping die, said apparatus additionally comprising:
   means for installing said blower/exhauster in said extruder, wherein said blower/exhauster is operatively connected in alignment with the longitudinal axis and proximate the exit end of said axial pipe shaping die so that gas exiting said discharge outlet flows in the direction of pipe travel through said extruder; and
   means for quenching the outer surface of said large diameter plastic pipe.

4. Apparatus in accordance with claim 1 wherein said means for providing motive gas comprises a compressed gas source, said apparatus additionally comprising:
   means for introducing compressed gas from said source into said motive gas inlet of said blower/exhauster.

5. Apparatus in accordance with claim 4 wherein the discharge flow of said blower/exhauster is from about 1300 SCFM to about 8000 SCFM and is preferably at least 1400 cfm, and the flow of said motive gas is about 63 SCFM at a pressure of from about 20 psi to about 150 psi.

6. Apparatus in accordance with claim 3 wherein said motive gas is compressed air and said large volume of cool ambient air is drawn into the open end of said large diameter plastic pipe so as to flow in contact with the inner surface of said large diameter plastic pipe and countercurrent to the discharge flow from said blower/exhauster.

7. Apparatus in accordance with claim 3 wherein said quench means comprises:
   vacuum tank means for receiving said large diameter plastic pipe; and
   a plurality of spray nozzles located in said vacuum tank means and arranged around said plastic pipe, permitting cooling fluid to be sprayed on the outer surface of said plastic pipe as said plastic pipe advances through said vacuum tank means.

8. Apparatus for cooling a plastic pipe as said plastic pipe advances from the exit end of a pipe shaping die, said plastic pipe being in a semi-molten state on exiting said die and said plastic pipe being in a rigid state after cooling so as to produce a rigid length of plastic pipe, said apparatus comprising:
   a hollow mandrel having in inner surface and an outer surface;
   a bushing having an inner surface disposed about said mandrel and spaced apart from said mandrel, wherein the inner surface of said bushing and the outer surface of said mandrel define an orifice for said pipe shaping die;
   a venturi blower/exhauster having a motive gas inlet, a suction inlet and a discharge outlet, said blower/exhauster being attachable to said die;
   means for supporting said blower/exhauster proximate the exit end of said die, for establishing flow of ambient air which contacts and cools the inner surface of said plastic pipe;
   wherein flow of relatively cool ambient air is established in said plastic pipe responsive to the flow of motive gas flowing through said blower/exhauster by drawing ambient air into said rigid length of plastic pipe so as to flow in contact with said inner surface of said plastic pipe and the inner surface of said mandrel, and countercurrent to the discharge fluid flow from said blower/exhauster;
   a vacuum tank means for receiving said plastic pipe which is in a semi-molten state; and
   a plurality of spray nozzles located in said vacuum tank means and arranged around said plastic pipe permitting cooling fluid to be sprayed on the outer surface of said plastic pipe as said plastic pipe advances through said die orifice to said vacuum tank means.

9. Apparatus in accordance with claim 2 wherein the outer diameter of said pipe shaping die orifice is from about 38 inches to about 46 inches.

10. Apparatus in accordance with claim 2, wherein the wall thickness of said large diameter plastic pipe is from about 2.6 inches to about 3.2 inches.

11. Apparatus in accordance with claim 1 wherein said large diameter plastic pipe is made of material selected from the group consisting of polyethylene and copolymers of ethylene and a minor quantity of monoolefin comonomers having 4 to 8 carbon atoms and mixtures of any two or more thereof.

12. A method of cooling a large diameter plastic pipe as said plastic pipe advances from the exit end of an axial pipe shaping die of an extruder, said method comprising the steps of:
   installing a venturi blower/exhauster in alignment with and proximate the exit end of said pipe shaping die, said blower/exhauster having a motive gas inlet, a suction inlet and a discharge outlet; and
   inducing a large quantity of relatively cool ambient air to flow along the inner surface of said large diameter plastic pipe by providing a relatively small quantity of motive air to said motive gas inlet, and wherein said large quantity of air enters said suction inlet and exits said discharge outlet of said blower/exhauster.

13. A method in accordance with claim 12 wherein said plastic pipe is made of material selected from the group consisting of polyethylene and copolymers of ethylene and a minor quantity of mono-olefin comonomers having 4 to 8 carbon atoms and mixtures of any two or more thereof.

14. A method in accordance with claim 12 wherein said axial pipe shaping die comprises a hollow mandrel having an inner surface and an outer surface, and a bushing having an inner surface disposed about and spaced apart from said outer surface of said mandrel, wherein the space between the inner surface of said bushing and the outer surface of said mandrel defines a pipe shaping die orifice, said method additional comprising the following step:

directing flow of said large quantity of air so as to contact said inner surface of said mandrel so as to cool said inner surface of said mandrel as well as said inner surface of said plastic pipe.

15. A method in accordance with claim 14 wherein the outer diameter of said axial pipe shaping die orifice is from about 38 inches to about 46 inches.

16. A method in accordance with claim 14 wherein the wall thickness of said large diameter plastic pipe is from about 2.6 inches to about 3.2 inches.

* * * * *